(12) United States Patent
Kashikar et al.

(10) Patent No.: US 10,271,256 B2
(45) Date of Patent: Apr. 23, 2019

(54) METHOD AND SYSTEM FOR PROVIDING ENHANCED PACKET DATA SERVICES TO A USER EQUIPMENT

(71) Applicant: SAMSUNG ELECTRONICS CO., LTD., Suwon-si, Gyeonggi-do (KR)

(72) Inventors: Anand Devidas Kashikar, Bangalore (IN); Satya Venkata Uma Kishore Godavarti, Bangalore (IN); Mohan Rao Naga Santha Goli, Bangalore (IN); Venkateswara Rao Manepalli, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/759,341

(22) PCT Filed: Oct. 29, 2013

(86) PCT No.: PCT/KR2013/009676
§ 371 (c)(1),
(2) Date: Jul. 6, 2015

(87) PCT Pub. No.: WO2014/106987
PCT Pub. Date: Jul. 10, 2014

(65) Prior Publication Data
US 2015/0358875 A1    Dec. 10, 2015

(30) Foreign Application Priority Data

Jan. 4, 2013   (IN) .............................. 49/CHE/2013
Jul. 16, 2013  (IN) ............................. 469/CHE/2013

(51) Int. Cl.
*H04W 36/14*   (2009.01)
*H04W 36/24*   (2009.01)
(Continued)

(52) U.S. Cl.
CPC ........... *H04W 36/24* (2013.01); *H04W 36/14* (2013.01); *H04W 36/30* (2013.01); *H04W 48/18* (2013.01)

(58) Field of Classification Search
CPC ..... H04W 36/14; H04W 36/16; H04W 36/24; H04W 36/30; H04W 36/32; H04W 36/34; H04W 36/36
See application file for complete search history.

(56) References Cited

U.S. PATENT DOCUMENTS

2009/0124212 A1* 5/2009 Islam .................... H04W 72/02
                                                             455/70
2010/0098028 A1   4/2010 Wu
(Continued)

FOREIGN PATENT DOCUMENTS

KR   10-2012-0045341 A   5/2012
WO   2011/073913 A1      6/2011

*Primary Examiner* — Scott M Sciacca
(74) *Attorney, Agent, or Firm* — Jefferson IP Law, LLP

(57) ABSTRACT

A method and system for providing enhanced packet data services to user equipment (UE) is disclosed. The method disclosed comprises: switching to a first Radio Access Network (RAN) from a second RAN when the UE suffers loss of coverage in the second RAN during a mobility of the UE, and transmitting a request to the first RAN when the UE detects the coverage in the second RAN to redirect the UE to the second RAN.

12 Claims, 7 Drawing Sheets

(51) Int. Cl.
  *H04W 36/36* (2009.01)
  *H04W 48/18* (2009.01)
  *H04W 36/30* (2009.01)

(56) References Cited

U.S. PATENT DOCUMENTS

| | | | |
|---|---|---|---|
| 2011/0059739 A1 | 3/2011 | Huang | |
| 2011/0069679 A1 | 3/2011 | Onishi et al. | |
| 2011/0149852 A1 | 6/2011 | Olsson et al. | |
| 2011/0319081 A1* | 12/2011 | Deivasigamani | H04W 48/20 455/436 |
| 2012/0208527 A1* | 8/2012 | Park | H04W 76/38 455/423 |
| 2012/0220299 A1* | 8/2012 | Sharma | H04W 76/068 455/436 |
| 2012/0224564 A1 | 9/2012 | Paisal et al. | |
| 2013/0070728 A1* | 3/2013 | Umatt | H04W 36/0022 370/331 |
| 2013/0208605 A1* | 8/2013 | Bautista | H04W 36/14 370/252 |
| 2013/0287002 A1* | 10/2013 | Kim | H04W 36/0022 370/331 |
| 2013/0336285 A1* | 12/2013 | Edara | H04W 36/16 370/331 |
| 2014/0079021 A1* | 3/2014 | Hsu | H04W 36/0022 370/331 |

* cited by examiner

[Fig. 1]
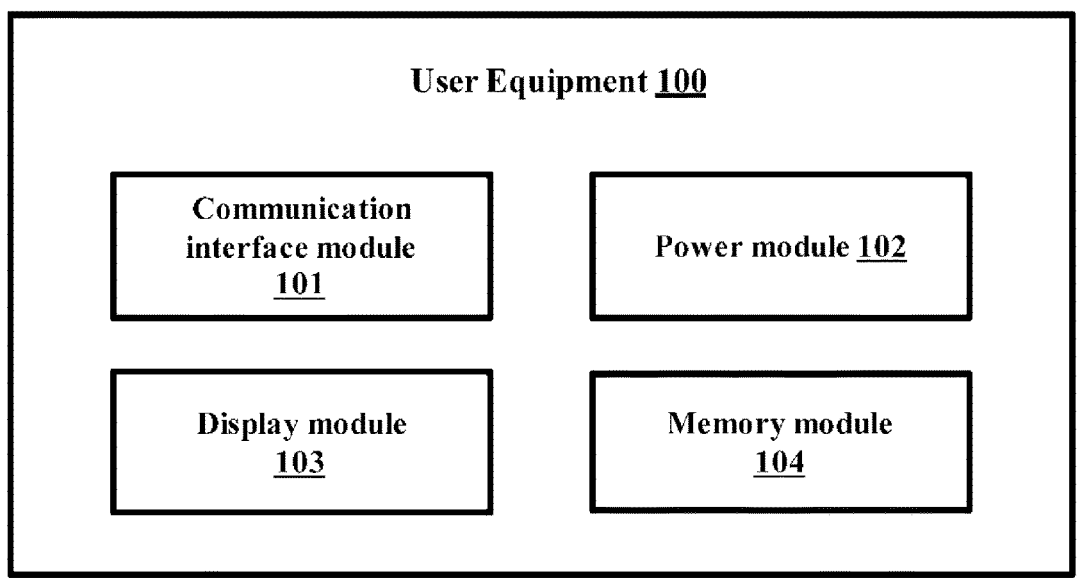

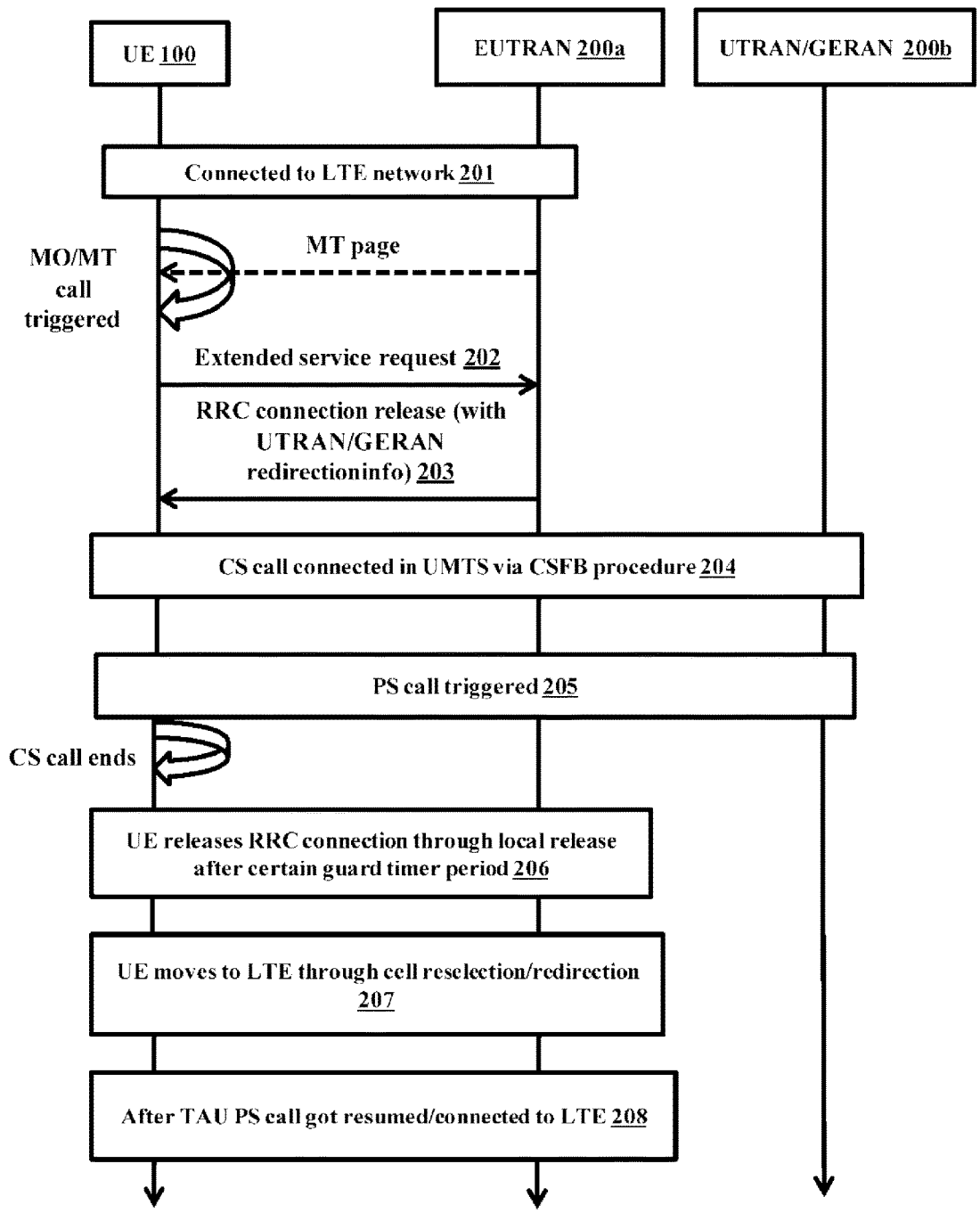
[Fig. 2]

[Fig. 3]
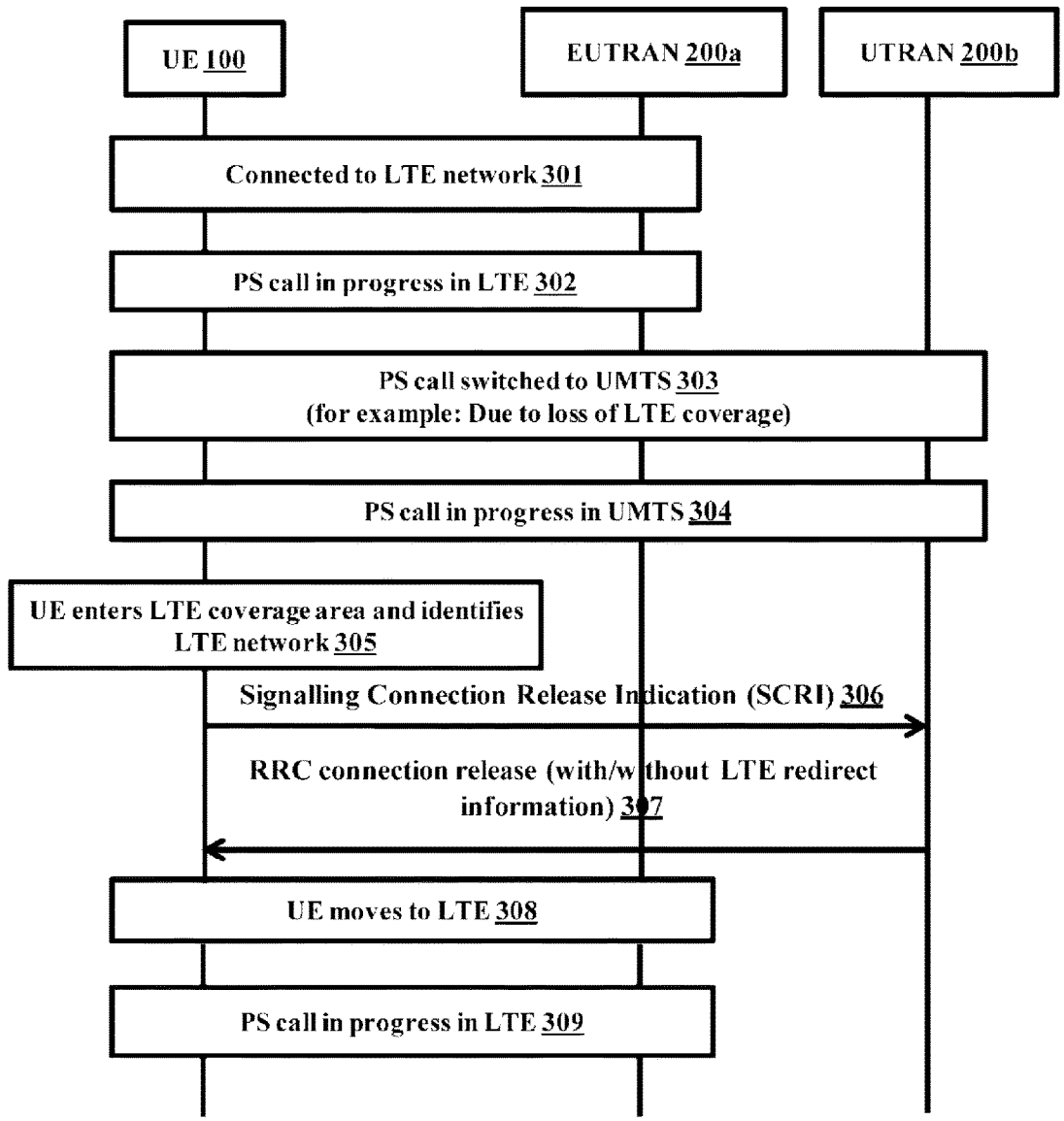

[Fig. 4]
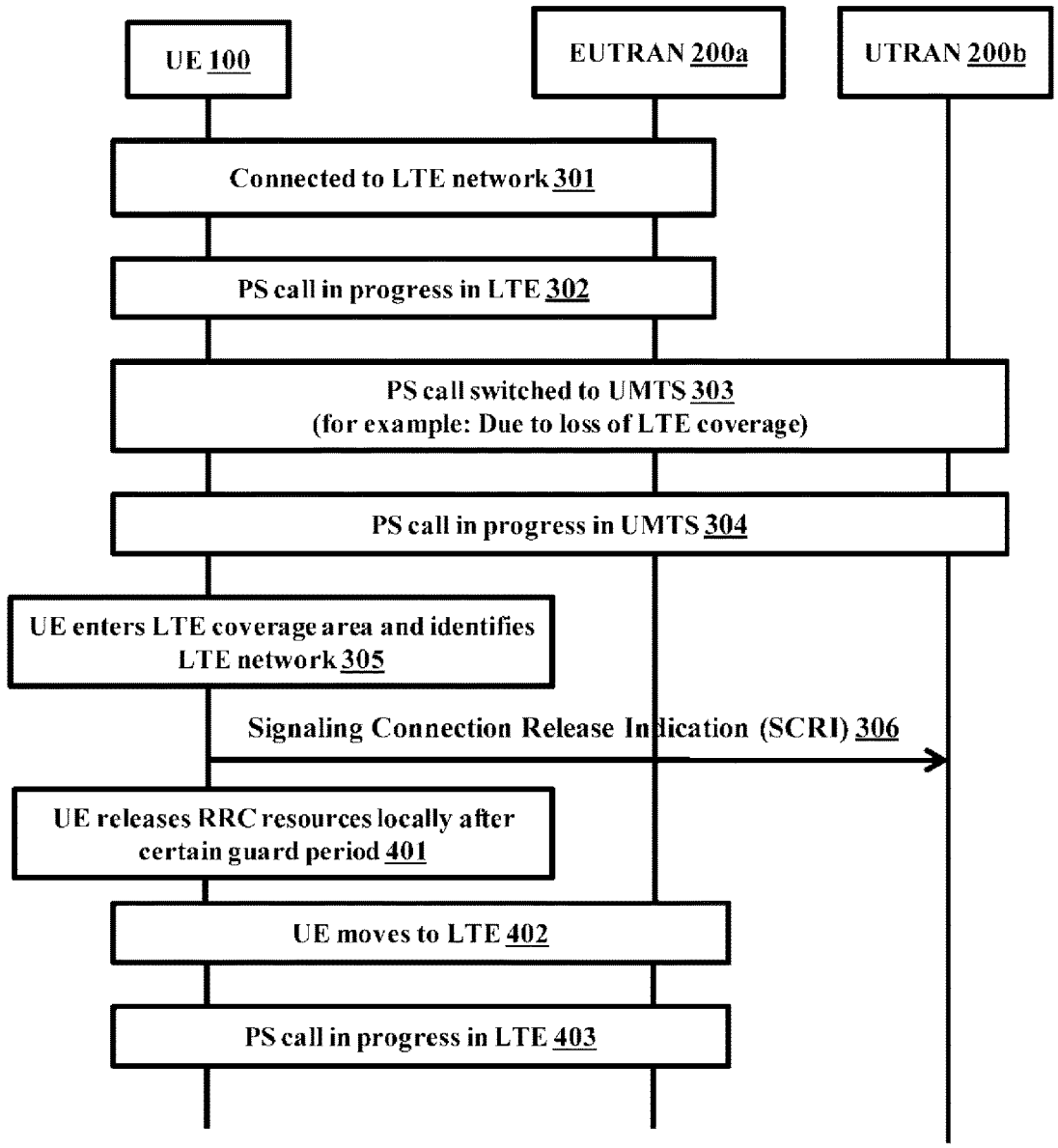

[Fig. 5]
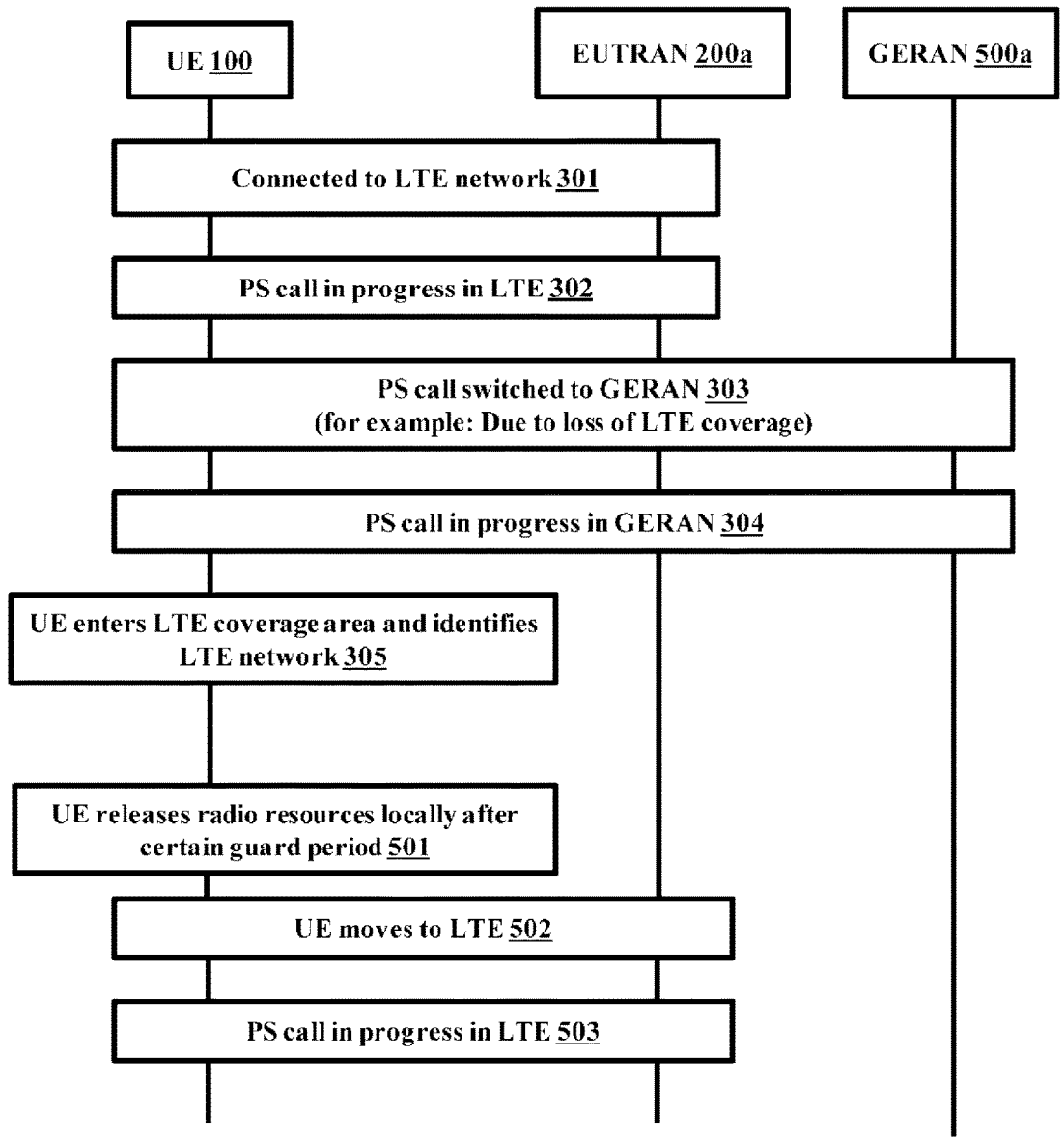

[Fig. 6]
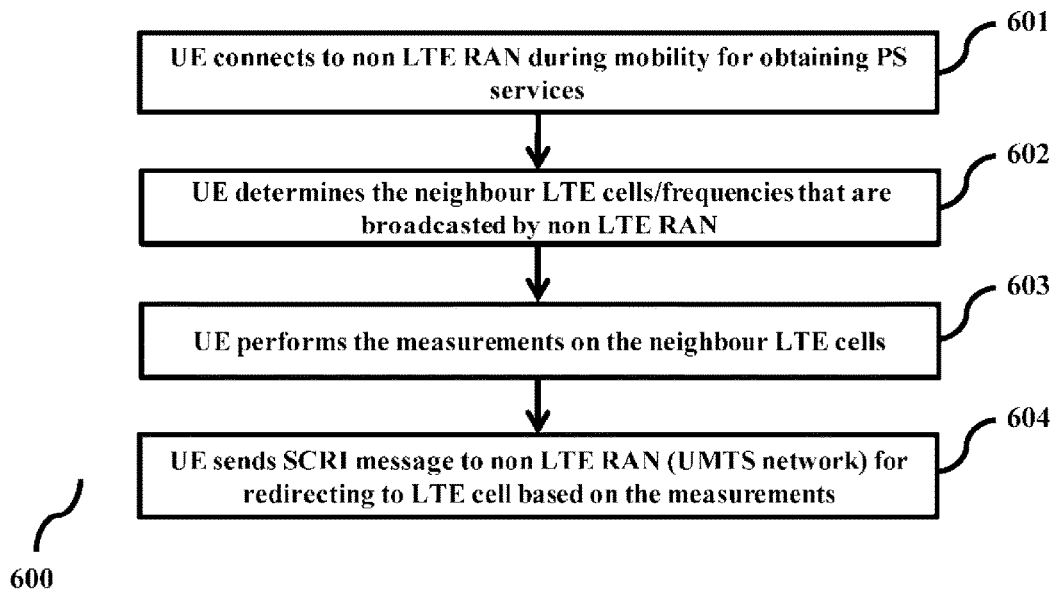

[Fig. 7]
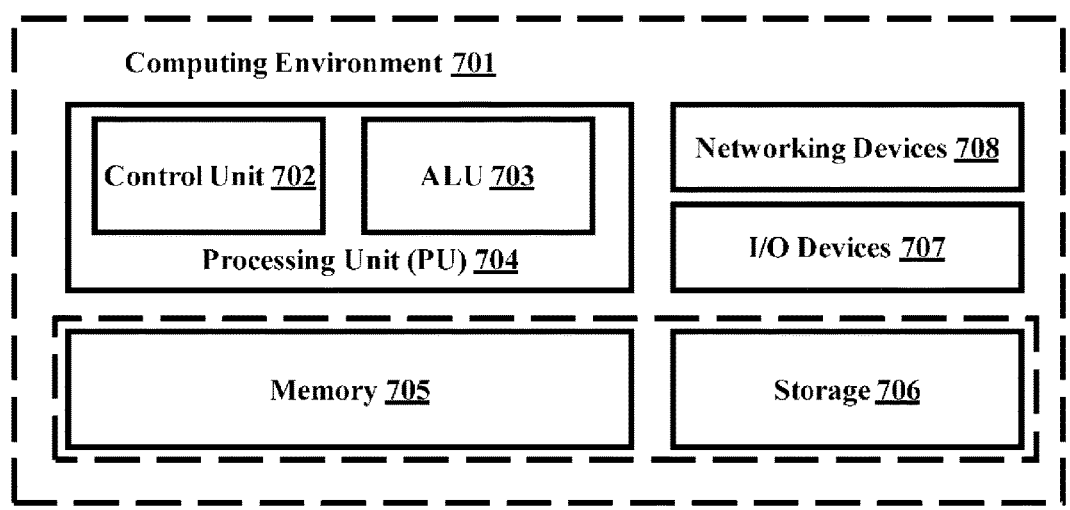

METHOD AND SYSTEM FOR PROVIDING ENHANCED PACKET DATA SERVICES TO A USER EQUIPMENT

TECHNICAL FIELD

The present invention relates to wireless communication systems and more particularly relates to a method and system for providing enhanced packet data services to User Equipment (UE).

BACKGROUND

The Third Generation Partnership Project (3GPP) Long Term Evolution (LTE) is an evolving high speed, high capacity standard for a User Equipment (UE) emerging as a globally accepted standard. The LTE that is being deployed globally operates in Packet Switched (PS) domain. Currently, UEs equipped with LTE technology utilize LTE PS domain to handle data traffic while voice traffic is handled by legacy Circuit Switched (CS) networks (legacy Radio Access Technologies (RATs)) such as Global System for Mobile communications (GSM), Universal Mobile Terrestrial System (UMTS) and GSM EDGE Radio Access Network (GERAN). To support CS domain communication such as voice calls the UE in LTE has to switch to CS supporting legacy RATs.

The Circuit Switched Fallback (CSFB) procedure standardized by 3GPP technical specification enables the UE to perform this switching during Mobile Originated (MO) or Mobile Terminated Call (MT). The 3GPP standard defines Inter-RAT (I-RAT) for mobility (switching) between LTE and earlier 3GPP technologies such as UMTS and GERAN and vice versa. To acquire a legacy RAT during I-RAT switching the 3GPP standard provides procedures like redirection, reselection, and hand over and so on.

In accordance with existing 3GPP standard for redirection based CSFB procedure, when the CS call is attempted while UE is in LTE, then the UE starts an Extended Service Request (ESR) procedure. When the ESR is received by E-UTRAN Node B (eNB) of the LTE network, the eNB provides the UE with Radio Resource Control (RRC) connection release along with redirection request including the target RAT frequency on to which the UE can camp for CS call. Further, after the completion of CS call, it is important for the network operators to move the UE to the EUTRAN for providing higher data rates and better user experience to its subscribers.

In the existing system, the network (can be either UTRAN or GERAN) may command the UE to redirect or handover to EUTRAN from UTRAN after the completion of CSFB call on the current RAT. However, not all the networks are following this approach, as it requires some changes in the network side. Though the CS call is ended in the UTRAN, the UE maintains the PS data session with the UTRAN. In such scenario, it is important to move the UE to idle mode for reselection to EUTRAN.

When the UE is in mobility across different radio access networks, there is a possibility that the UE loses the coverage of the EUTRAN. The UE connects to the UTRAN for obtaining the packet data services when it loses the coverage of the EUTRAN. Further, during the mobility, the UE may detect the EUTRAN and it is important to move the UE to the EUTRAN upon its detection for providing enhanced packet data services to the UE.

In the light of above discussion, it is desirable to have a mechanism that allows the UE to reselect or redirect to the EUTRAN upon completion of CS call on UTRAN/GERAN for providing enhanced packet data services. It is further desirable to have a mechanism for bringing the UE to idle mode for reselection or redirection to the LTE network.

SUMMARY

The principal object of the embodiments herein is to provide a method and system for providing enhanced packet data services to User Equipment (UE) during mobility when UE suffers loss of coverage in the connected network.

Another object of the invention is to provide a method and system to bring UE to idle mode after completion of Circuit Switched (CS) call for reselection to LTE within a short span of time.

Accordingly the invention provides a method for providing enhanced packet data services to a User Equipment (UE) during mobility across different Radio Access Networks (RANs), wherein the method comprises switching the UE to a first RAN for obtaining packet data services during the mobility, wherein the UE switches to the first RAN when the UE suffers loss of coverage in a second RAN, wherein the first RAN is one of: second generation (2G) RAN or a third generation (3G) RAN or a GSM EDGE RAN (GERAN), wherein the second RAN is a Long-Term Evolution (LTE) RAN. Further, the method comprises sending a request to the first RAN, when the UE detects the coverage in the second RAN to redirect the UE to the second RAN for providing the enhanced packet data services.

Accordingly the invention provides a wireless network for providing enhanced packet data services to a User Equipment (UE) during mobility across different Radio Access Networks (RANs), wherein the wireless network is configured to release Radio Resource Control (RRC) connection of the UE for providing the enhanced packet data services to the UE after receiving a request from the UE, wherein the request is sent when the UE suffers loss of coverage in at least one RAN.

Accordingly, the invention provides a user equipment for obtaining enhanced packet data services during mobility across different Radio Access Networks (RANs), wherein the UE comprises an integrated circuit. Further the integrated circuit comprises at least one processor and at least one memory. The memory comprises a computer program code within the integrated circuit. At least one memory and the computer program code with the at least one processor cause the UE to send a request to a first RAN in which the UE is currently connected, wherein the request is sent when coverage is detected in a second RAN for redirecting to the second RAN for obtaining the enhanced packet data services.

In the invention, said request comprises a Signaling Connection Release Indication (SCRI) message.

In the invention, said UE is further configured to receive a Radio Resource Control (RRC) connection release message from said first RAN, in response to sending said SCRI message to perform one of: redirection, reselection by said UE to said second RAN.

In the invention, said UE is configured to release said RRC connection by said UE after receiving said RRC connection release connection message from said first RAN.

In the invention, said UE is further configured to release said RRC connection locally, when a configured time interval is expired after sending said SCRI message to said first RAN.

In the invention, said UE is configured to start a timer with said configured time interval after detecting said second RAN, further after expiry of said configured time interval if said UE is attached with said first RAN then said UE is configured to release said RRC connection locally and said UE is configured to perform one of: reselection, redirection to said second RAN.

In the invention, said UE is configured to perform one of: redirection or reselection to said second RAN for obtaining said enhanced packet data services.

In the invention, said UE is configured to detect said second RAN during said mobility across said different RANs, wherein said second RAN is detected using at least one of: neighbor cell list in said first RAN, a database in said UE, based on Global Positioning System (GPS) coordinates of said second RAN and based on measurements performed on said second RAN, wherein said database stores System Information Blocks (SIBs), further said UE is configured to obtain said SIB values from said second RAN on which said UE was connected initially.

In the invention, said UE is further configured to start said timer with said configured time interval when said UE detects said second RAN and said UE is configured to release said radio connection with said GERAN for obtaining said enhanced packet data services.

In the invention, said UE is further configured to redirect to said second RAN when said UE is attached to said first RAN for obtaining circuit switched (CS) services, wherein said UE is configured to perform one of: redirection, reselection after completion of said CS services in said first RAN; release said RRC connection locally with said first RAN after said configurable time interval is expired; and perform one of: redirection, reselection to said second RAN for obtaining said enhanced packet data services after releasing said RRC connection. These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 1 illustrates the block diagram of a user equipment with various modules, according to embodiments as disclosed herein;

FIG. 2 illustrates a sequence diagram in which the UE performs implicit connection release for reselecting to LTE network, according to embodiments as disclosed herein;

FIG. 3 illustrates the sequence diagram explaining the process of connecting the UE from 2G or UMTS network to the LTE network during mobility, according to the embodiments as disclosed herein;

FIG. 4 illustrates the sequence diagram in which the UE performs implicit connection release for reselecting to LTE network during mobility, according to embodiments as disclosed herein;

FIG. 5 illustrates the sequence diagram in which the UE performs implicit connection release for reselecting to LTE network during mobility in another embodiment of the invention;

FIG. 6 illustrates a flow diagram explaining the process of detecting the LTE network, when the UE is connected to the UMTS or 2G network, according to the embodiments as disclosed herein; and FIG. 7 illustrates a computing environment implementing the method and system for providing enhanced packet data services to user equipment, according to the embodiments as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system for providing enhanced packet data services to user equipment (UE) when said UE is in mobility between a first RAN and a second RAN. In an embodiment, the first RAN can be a second generation (2G) RAN, a third generation (3G) RAN, GSM EDGE RAN (GERAN). In an embodiment, the second RAN comprises a Long-Term Evolution (LTE) RAN.

The method disclosed herein provides the mechanism for bringing the UE to the LTE network from a Universal Mobile Telecommunications System (UMTS) network or 2G network for providing enhanced packet data services. Though the packet data services are supported in UMTS networks, it is important for the network operators to provide enhanced data rates and better user experience to their subscribers, which can only be available with the LTE network. Hence, the method and system described herein allows the UE to reselect to the LTE network from a UMTS or a 2G network.

The method also describes the mechanism for bringing the UE to the LTE network, when the UE is redirected to either a UMTS network or a 2G network for obtaining circuit switched (CS) services.

In an embodiment, the UE may lose the coverage of LTE network during its mobility across different radio access networks. In such cases, the disclosed method provides a mechanism for allowing the UE to reselect or redirect to the LTE network when the UE detects the coverage of LTE network during mobility.

In an embodiment, the UE sends a Signaling Connection Release Indication (SCRI) message to the UMTS network for reselection or redirection to the LTE network. Further, the UE obtains a RRC connection release message from UTRAN, in response to the SCRI message. In an embodiment UE starts a guard timer at the detection of EUTRAN or at the release of CS call and releases the connection to network locally if there is no action/response from the network before the guard timer expires.

In an embodiment, the UE starts a timer and waits for certain time interval for reselection or redirection to the LTE network without sending the SCRI message.

Throughout the description the terms LTE network or EUTRAN, UMTS network or UTRAN, 2G or GERAN are used interchangeably.

Referring now to the drawings, and more particularly to FIGS. 1 through 7, where similar reference characters denote corresponding features consistently throughout the figures, there are shown preferred embodiments.

FIG. 1 illustrates the block diagram of user equipment with various modules, according to embodiments as disclosed herein. As depicted in the figure, the user equipment (UE) 100 comprises a communication interface module 101, a power module 102, a display module 103 and a memory module 104. The communication interface module 101 helps the UE to connect to the wireless network. The power module 102 holds the battery information and status of battery power in the user equipment 100. The battery information comprises the amount of charge that the device posses and the time period for which the user equipment 100 will be in operation and so on. The display module 103 of the user equipment 100 comprises of a user interface which can be a virtual keypad or through any other means by which a user can input some data into the user equipment 100. The memory module 104 may include a random access memory (RAM) or another type of dynamic storage device that may store information and instructions, for example an application, for execution by processor, a read-only memory (ROM) device or another type of static storage device.

FIG. 2 illustrates a sequence diagram in which the UE performs implicit connection release for reselecting to LTE network, according to embodiments as disclosed herein. As depicted in the sequence diagram, initially the UE 100 is connected (201) to the EUTRAN 200a (LTE network). When the UE 100 is connected to EUTRAN 200a for obtaining packet data services, there is a possibility that a mobile originated (MO) call or a Mobile terminated (MT) call takes place at the UE 100.

The EUTRAN 200a sends a paging message to the UE 100. The paging message from EUTRAN 200a indicates that the UE 100 has an active incoming call (MT call).

As the EUTRAN 200a does not support circuit switched services, the UE 100 has to fall back from the LTE network (EUTRAN 200a) to either 3G or 2G network for receiving the CS call (MT call) and this procedure of fall back from LTE network to other radio access networks (for example, GSM EDGE Radio Access Network (GERAN) or Universal Terrestrial Radio Access Network (UTRAN)) that supports CS services is commonly termed as Circuit Switched Fallback (CSFB).

The UE 100 sends (202) an Extended Service Request (ESR) to the EUTRAN 200a for initiating the CSFB procedure.

The method of circuit switched fallback (CSFB) from LTE to GSM EDGE Radio Access Network (GERAN) or Universal Terrestrial Radio Access Network (UTRAN) 200b is as described herein. The CSFB procedure includes the interfaces between the different radio access network (RAN) types and the core network entities. For supporting circuit switched (CS) services, a connection to the mobile switching centre (MSC) server is established. The mobility management entity (MME) of the evolved packet system interfaces to the MSC server through a SGs interface. The CSFB mechanism is implemented using the SGs interface between MME and MSC. For CSFB, there will always be an RRC connection established in order to exchange signalling messages for initiating and preparing the fallback.

In the case of terminating voice call, the UE 100 has to receive a paging message. In the case of mobile originating call, the UE 100 has to send a service request message. The UE 100 may also be involved in a data transfer when a voice call has to be set up.

Several CSFB procedures exist for the various target radio access technologies (RATs). When the MSC receives an incoming voice call it sends a paging request to the MME over the SGs interface. The MME establishes an S1 connection and sends the CS SERVICE NOTIFICATION message to the UE 100. The MME informs the MSC with the SERVICE REQUEST message over SGs interface that the UE 100 is in connected mode. Further, the UE 100 upon receiving the CS SERVICE NOTIFICATION message, sends (202) the ESR message. This request message is used to respond to the CS fallback request from the MME and includes a "CSFB response" indicator that indicates whether the UE 100 accepts or rejects a paging for CS fallback. If the UE accepts the CSFB, the MME then informs the EUTRAN 200a with a UE CONTEXT MODIFICATION REQUEST, which indicates that the UE 100 should be moved to UTRAN or GERAN by means of CSFB procedure.

Further, the eNodeB (or the EUTRAN 200a) sends a CONTEXT MODIFICATION RESPONSE to the MME 200b stating that the UE 100 is ready for a CS fallback.

The EUTRAN 200a (eNodeB) may request measurement reports of UTRAN or GERAN target cells from the UE 100 to determine a suitable carrier frequency on the target radio access technology for CSFB procedure.

The EUTRAN 200a sends (203) a RRC connection release with redirection to GERAN or UTRAN. Further, the EUTRAN 200a requests the MME to release the S1 connection for the UE 100 with the UE CONTEXT RELEASE REQUEST message. This message also specifies whether the UE 100 would be able to receive packet switched services in the target cell.

The UE 100 selects (204) a cell of the target radio access technology (GERAN or UTRAN 200b) and establishes a radio signalling connection with that cell using the CSFB procedure as described above.

When the UE 100 is connected to the UTRAN or GERAN 200b for obtaining CS services (CS call), there is a possibility of packet switched (PS) call for the UE 100 to get triggered. When PS call is triggered, the UE 100 continues (205) to stay connected with the UTRAN or GERAN 200b.

When the UE 100 is in active packet data session (PS call), the CS call at the UE 100 may be terminated. Though the CS call is terminated, the UE 100 continues the active packet data session with the UTRAN or GERAN 200b. In this case, there is no need for UE 100 to stay connected with UTRAN or GERAN 200b, as the EUTRAN provides enhanced packet data services to the UE 100.

The UE 100 releases (206) the RRC connection with the UTRAN or GERAN 200b after certain guard time interval for reselection or redirecting to EUTRAN 200a (LTE) for obtaining enhanced packet data services.

In an embodiment, the UE 100 releases the RRC resources locally without sending SCRI message to the UTRAN or GERAN 200b for terminating the active packet data session. The guard time interval for the UE 100 to release the RRC resources may be for example three to five seconds after the release of CS call from UTRAN or GERAN 200b to provide time for the network to release the connection if it intends to move the UE 100 to EUTRAN 200a.

In an embodiment, the guard time interval for releasing the RRC resources locally by the UE 100 may be fixed or may be configurable.

Further, the UE 100 moves (207) to the EUTRAN 200*a* (LTE cell) either through reselection or redirection for obtaining enhanced packet data services. The packet data services will be continued (208) at the EUTRAN, after performing Tracking Area Update (TAU) of the UE 100.

Hence, with the above described procedure, the UE 100 is brought back to EUTRAN 200*a* for providing enhanced packet data services, after the termination of the CS call in the UTRAN or GERAN 200*b*.

FIG. 3 illustrates the sequence diagram explaining the process of connecting the UE from 2G or 3G network to the LTE network during mobility, according to the embodiments as disclosed herein. As depicted in the sequence diagram, the UE 100 is connected (301) to the EUTRAN 200*a* for obtaining the PS services.

The UE 100 obtains (302) the PS services as long as the UE 100 is connected to the EUTRAN 200*a*. During mobility of the UE 100, there is a possibility that the UE 100 suffers loss of coverage in the EUTRAN 200*a*. When the UE loses the coverage in the EUTRAN 200*a*, the UE 100 switches (303) to the UTRAN 200*b* (UMTS or 3G network) for continuing the PS services.

The UE 100 continues (304) the PS session with the UTRAN 200*b*. When the PS session is active at the UE 100, due to the mobility of the UE 100, there is a possibility that the UE 100 enters (305) the EUTRAN 200*a* (LTE) coverage area and detects a cell that belongs to the EUTRAN 200*a*.

Once the UE detects the EUTRAN 200*a* (LTE cell), there is no need for the UE 100 to continue the PS session with UTRAN 200*b*. Further it is important for the network operator or the service provider of the UE 100 to bring the UE 100 back to the EUTRAN 200*a* for providing enhanced data services, which are only supported in the EUTRAN 200*a* (LTE).

In order to connect to EUTRAN 200*a* for obtaining enhanced packet data services, the UE 100 sends (306) a Signaling Connection Release Indication (SCRI) message to the UTRAN 200*b* for releasing the connection with the UTRAN 200*b*.

In response to the SCRI message sent by the UE 100 to the UTRAN 200*b*, the UTRAN 200*b* releases (307) the RRC connection of the UE 100, which allows the UE 100 to redirect or reselect to the EUTRAN 200*a* for obtaining enhanced packet data services.

When the UE receives the RRC connection release message from the UTRAN 200*b*, the UE 100 moves (308) to the EUTRAN 200*a* (LTE cell) either through reselection or redirection.

Further, the UE 100 continues (309) the PS data session with the EUTRAN 200*a* after reselection or redirection from UTRAN 200*b*.

In this way, the UE 100 is allowed to connect to EUTRAN 200*a*, for obtaining enhanced packet data services during mobility of the UE 100 across different radio access networks (RANs).

FIG. 4 illustrates the sequence diagram in which the UE performs implicit connection release for reselecting to LTE network during mobility, according to embodiments as disclosed herein. As depicted in the sequence diagram, the UE 100 is connected (301) to the EUTRAN 200*a* for obtaining the PS services.

The UE 100 obtains (302) the PS services as long as the UE 100 is connected from the EUTRAN 200*a*. During mobility of the UE 100, there is a possibility that the UE 100 loses the coverage of the EUTRAN 200*a*. When the UE loses the coverage of the EUTRAN 200*a*, the UE 100 switches (303) to the UTRAN 200*b* (UMTS or 3G network) for continuing the PS services.

The UE 100 continues (304) the PS session with the UTRAN 200*b*. When the PS session is active at the UE 100, due to the mobility of the UE 100, there is a possibility that the UE 100 enters (305) the EUTRAN 200*a* (LTE) coverage area and detects a LTE cell that belongs to the EUTRAN 200*a*.

Once the UE detects the EUTRAN 200*a* (LTE cell), there is no need for the UE 100 to continue the PS session with UTRAN 200*b*. Further it is important for the network operator or the service provider of the UE 100 to bring the UE 100 back to the EUTRAN 200*a* for providing enhanced data services, which are only supported in the EUTRAN 200*a* (LTE).

In order to connect to EUTRAN 200*a* for obtaining enhanced packet data services, the UE 100 sends (306) a Signaling Connection Release Indication (SCRI) message to the UTRAN 200*b* for releasing the connection with the UTRAN 200*b*.

When the SCRI message is sent to the UTRAN 200*b*, the UE 100 releases (401) the RRC resources locally after certain guard time interval if there is no response from the UTRAN 200*b* within the guard time interval. The guard time interval for the UE 100 to release the RRC resources may be for example three to five seconds after sending SCRI message to the UTRAN 200*b*

In an embodiment, the guard time interval used by the UE 100 for releasing the resources locally may be fixed or may be configurable.

When the connection is released by the UE 100 locally from the current RAT, the UE 100 moves (402) to the EUTRAN 200*a* (LTE cell) either through reselection or redirection.

Further, the UE 100 continues (403) the PS data session with the EUTRAN 200*a*, where the UE 100 obtains enhanced packet data services after reselection or redirection from UTRAN 200*b*.

FIG. 5 illustrates the sequence diagram in which the UE performs implicit connection release for reselecting to LTE network during mobility in another embodiment of the invention. As depicted in the sequence diagram, the UE 100 is connected (301) to the EUTRAN 200*a* for obtaining the PS services.

The UE 100 obtains (302) the PS services as long as the UE 100 is connected from the EUTRAN 200*a*. During mobility of the UE 100, there is a possibility that the UE 100 loses the coverage of the EUTRAN 200*a*. When the UE loses the coverage of the EUTRAN 200*a*, the UE 100 switches (303) to the GERAN 500*c* for continuing the PS services.

The UE 100 continues (304) the PS session with the GERAN 500*a*. When the PS session is active at the UE 100, due to the mobility of the UE 100, there is a possibility that the UE 100 enters (305) the EUTRAN 200*a* (LTE) coverage area and detects a LTE cell that belongs to the EUTRAN 200*a*.

Once the UE detects the EUTRAN 200*a* (LTE cell), there is no need for the UE 100 to continue the PS session with GERAN 500*a*. Further it is important for the network operator or the service provider of the UE 100 to bring the UE 100 back to the EUTRAN 200*a* for providing enhanced data services, which are only supported in the EUTRAN 200*a* (LTE).

In order to connect to EUTRAN 200*a* for obtaining enhanced packet data services, the UE 100 starts a guard timer at the detection of EUTRAN and releases the connection to network (GERAN 500*a*) at the expiry of the guard timer if there is no action from network (GERAN 500*a*) for the UE to move to EUTRAN from the GERAN 500*a*.

The UE 100 releases (501) the radio resources locally after certain guard time interval if there is no response from the network within the guard time interval. The guard time interval for the UE 100 to release the radio resources may be for example three to five seconds after detecting the EUTRAN 200*a*.

When the connection is released by the UE 100 locally from the current RAT (GERAN 500*a*), the UE 100 moves (502) to the EUTRAN 200*a* (LTE cell) either through reselection or redirection.

Further, the UE 100 continues (503) the PS data session with the EUTRAN 200*a*, where the UE 100 obtains enhanced packet data services after reselection or redirection from UTRAN 200*b*.

FIG. 6 illustrates a flow diagram explaining the process of detecting the LTE network, when the UE is connected to the UMTS or 2G network, according to the embodiments as disclosed herein. The flow diagram 600 describes the various steps involved in reselection or redirection by the UE 100 to the LTE network from the UMTS or the 2G network. Initially, the UE 100 connects (601) to the non LTE RAN (UMTS 200*b* or GERAN 500*a*) for obtaining the packet switched services when the UE loses the coverage of LTE network 200*a* during mobility. The UE 100 continues to obtain the packet data services from the non LTE RAN. While active in PS call on non LTE RAN, the UE 100 determines (602) the frequencies of LTE cells that are broadcasted by the non LTE network. The UE 100 upon determining the frequencies of LTE cells that are broadcasted by the non LTE RAN, performs (603) the measurements on the frequencies of the LTE cells.

In an embodiment, performing the measurements on the frequencies of the LTE cells may include measuring the signal strength of the LTE cell. The UE is allowed to redirect or reselect to a target LTE cell only when the measurements meet some predefined criteria.

In an embodiment, the UE 100 performs measurements periodically which include measuring the signal strengths of the LTE cells using a timer. For a certain time interval the UE 100 performs the measurements on the LTE cells and in the next time interval UE does not perform the measurements on the LTE cells. In this way, the UE 100 performs ON and OFF measurements based on timers.

In an embodiment, the time period for detecting the LTE cells can be reduced by using an acquisition database in the UE 100, which stores the values of System Information Block.

In an embodiment, the UE the UE 100 may use neighbor cell list provided by the non LTE RAN for reselection or redirection to the LTE cell.

In an embodiment, the UE 100 may use Global Positioning System (GPS), with which the UE 100 can identify the coordinates of the target LTE cell, while connected to the non LTE RAT.

In an embodiment, the UE 100 may also check the acquisition database to determine the availability of LTE cell information, when UE 100 is in connection with the non LTE RAN.

When the UE 100 determines the presence of LTE cells, the UE 100 performs the measurements on those LTE cells that are detected. If the measurements performed by the UE 100 meet certain criteria for reselection or redirection, then the UE 100 sends (604) the SCRI message to the non LTE RAN, when the non LTE RAN is UMTS 200*b* for redirection or reselection to the target LTE cell (LTE cell detected by the UE 100 by performing measurements).

If the non LTE RAN is GERAN 500*a* (or another GERAN), then the UE 100 releases the radio resources locally after a guard time period.

When the SCRI message is sent to the non LTE RAN (UTRAN 200*b*), In an embodiment, the UE 100 releases the RRC resources locally after certain guard time interval if there is no response from the UTRAN 200*b* within the guard time interval as described in the above scenarios. Finally, the UE 100 redirects or reselects to the LTE cell (EUTRAN 200*a*) for obtaining enhanced packet data services. The various actions in flow diagram 600 may be performed in the order presented, in a different order or simultaneously. Further, in some embodiments, some actions listed in FIG. 6 may be omitted.

FIG. 7 illustrates a computing environment implementing the method and system for providing enhanced packet data services to user equipment, according to the embodiments as disclosed herein, according to the embodiments as disclosed herein. As depicted the computing environment 701 comprises at least one processing unit 704 that is equipped with a control unit 702 and an Arithmetic Logic Unit (ALU) 703, a memory 705, a storage unit 706, plurality of networking devices 708 and a plurality Input output (I/O) devices 707. The processing unit 704 is responsible for processing the instructions of the algorithm. The processing unit 704 receives commands from the control unit in order to perform its processing. Further, any logical and arithmetic operations involved in the execution of the instructions are computed with the help of the ALU 703.

The overall computing environment 701 can be composed of multiple homogeneous and/or heterogeneous cores, multiple CPUs of different kinds, special media and other accelerators. The processing unit 704 is responsible for processing the instructions of the algorithm. Further, the plurality of processing units 704 may be located on a single chip or over multiple chips.

The algorithm comprising of instructions and codes required for the implementation are stored in either the memory unit 705 or the storage 706 or both. At the time of execution, the instructions may be fetched from the corresponding memory 705 and/or storage 706, and executed by the processing unit 704.

In case of any hardware implementations various networking devices 708 or external I/O devices 707 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1 and 7 include blocks which can be at least one of a hardware device, or a combination of hardware device and software module.

A method and system for providing enhanced packet data services to user equipment (UE) is disclosed. The method and the system disclosed herein provides the mechanism for bringing the UE to a LTE network from a UMTS network or 2G network for providing enhanced packet data services. Further, the method and the system provides a mechanism for redirecting the UE to LTE network when it is determined the UE has left the LTE network to the UMTS network or 2G network for obtaining CS services. The UE is redirected or reselected to the LTE network, upon the completion of CS services. The method and the system also provides the approaches that allow the UE to be in the LTE network during mobility of the UE across different radio access networks.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for operating a user equipment (UE), the method comprising:
   detecting a coverage loss in a second radio access network (RAN);
   switching to a first RAN from the second RAN in response to the detecting of the coverage loss in the second RAN;
   detecting a cell that belongs to the second RAN while a session with the first RAN is active; and
   releasing a connection with the first RAN, after a predefined time interval elapses, without transmitting a signaling connection release indication message to the first RAN,
   wherein the predefined time interval starts in response to the detecting of the cell that belongs to the second RAN while the session with the first RAN is active.

2. The method of claim 1,
   wherein the first RAN is one of a second generation (2G) RAN, a third generation (3G) RAN or a GSM EDGE RAN (GERAN), and
   wherein the second RAN is a long-term evolution (LTE) RAN.

3. The method of claim 1, further comprising:
   starting a timer for the predefined time interval in response to the detecting of the cell.

4. The method of claim 1, further comprising:
   performing one of redirection and reselection to the second RAN for obtaining enhanced packet data services.

5. The method of claim 1, further comprising:
   detecting the second RAN during a mobility of the UE across different RANs,
   wherein the second RAN is detected based on at least one of a neighbor cell list in the first RAN, a database in the UE, global positioning system (GPS) coordinates of the second RAN, or measurements performed on the second RAN, and
   wherein the database stores system information blocks (SIBs) that are obtained from the second RAN on which the UE is connected initially.

6. The method of claim 1, wherein the releasing of the connection with the first RAN comprises:
   releasing the connection with the first RAN, without the transmitting the signaling connection release indication message to the first RAN; and
   receiving a connection release message from the first RAN.

7. A user equipment (UE) comprising:
   a processor coupled to at least one networking device,
   wherein the processor is configured to:
     detect a coverage loss in a second radio access network (RAN),
     control to switch to a first RAN from the second RAN in response to the detection of the coverage loss in the second RAN,
     detect a cell that belongs to the second RAN while a session with the first RAN is active, and
     release a connection with the first RAN, after a predefined time interval elapses, without transmitting a signaling connection release indication message to the first RAN, and
   wherein the predefined time interval starts in response to the detecting of the cell that belongs to the second RAN while the session with the first RAN is active.

8. The UE of claim 7,
   wherein the first RAN is one of a second generation (2G) RAN, a third generation (3G) RAN or a GSM EDGE RAN (GERAN), and
   wherein the second RAN is a long-term evolution (LTE) RAN.

9. The UE of claim 7, wherein the processor is further configured to:
   start a timer for the predefined time interval in response to detecting of the cell.

10. The UE of claim 7, wherein the processor is further configured to:
    perform one of redirection and reselection to the second RAN for obtaining enhanced packet data services.

11. The UE of claim 7,
    wherein the processor is further configured to detect the second RAN during a mobility of the UE across different RANs,
    wherein the second RAN is detected based on at least one of a neighbor cell list in the first RAN, a database in the UE, global positioning system (GPS) coordinates of the second RAN or measurements performed on the second RAN, and
    wherein the database stores system information blocks (SIBs) that are obtained from the second RAN on which the UE is connected initially.

12. The UE of claim 7, wherein the connection with the first RAN is released, without the transmitting of the signaling connection release indication message to the first RAN and receiving a connection release message from the first RAN.

* * * * *